though the ratio may be optionally selected over a broader range. In the industrial practice of this invention, the conversion should preferably be 5 to 50% and more desirably 1 to 30%.

3,825,604
PROCESS FOR PREPARING CATECHOL AND HYDROQUINONE

Katsuto Matsuzawa, Akira Matukuma, and Iwao Takagishi, Tokyo, and Kenji Yoshida, Kawasaki, Japan, assignors to Mitsubishi Chemical Industries Limited, Tokyo, Japan
No Drawing. Filed Dec. 20, 1971, Ser. No. 210,214
Claims priority, application Japan, Dec. 30, 1970, 46/125,873
Int. Cl. C07c 37/00
U.S. Cl. 260—621 G  11 Claims

ABSTRACT OF THE DISCLOSURE

Catechol and hydroquinone can be advantageously manufactured on an industrial scale by oxidizing phenol with hydrogen peroxide, wherein the concentration of phenol feed is adjusted to above 10%, by weight, based on the total weight of feed, in the presence of an iron catalyst compound wherein the concentration of iron compound is adjusted to below 1 mole percent based on the phenol.

BACKGROUND OF THE INVENTION

Field of the Invention

The present invention relates to a process for preparing catechol and hydroquinone. More particularly, the present invention relates to a process for preparing catechol and hydroquinone by oxidizing phenol with hydrogen peroxide.

DESCRIPTION OF PRIOR ART

Catechol and hydroquinone are an industrially useful compound as an intermediate raw material for medicines, perfumes, etc. and a material for photography. It is well known to produce these dihydroxybenzenes, by oxidation of phenol with a peracid (French Patent No. 1,479,354), or with Fenton's reagent (oxidation with hydrogen peroxide in the presence of ferrous salt—A. Chwala et al. J. Prakt. Chem. *152*, 45, 1939, Henderson et al. J. Chem. Soc. *97* 1666, Stein et al. J. Chem. Soc. p. 3265, 1951) and the like. However, those methods which use a peracid are not completely satisfactory, since they require expensive raw materials and assistants and require rather complicated reaction apparatus.

In those methods which use Fenton's reagent as described in the above cited literature, the reaction is carried out at room temperature over a long period of time using a large amount of ferrous sulfate and at low concentrations of phenol. Those prior art methods, therefore are not completely satisfactory since: (1) dihydroxybenzenes produced in the reaction product solution are so low in concentration that it then cannot be efficiently recovered. (2) The catalyst is deposited in the reaction system thereby causing undesirable side reactions which lower the selectivity of the reaction for dihydroxybenzene. (3) The space time yield of dihydroxybenzenes is quite low. These methods therefore cannot be placed into practical commercial use.

SUMMARY OF THE INVENTION

Accordingly, one object of the present invention is to provide a process for preparing catechol and hydroquinone, which can be easily and advantageously carried out on an industrial scale.

As a result of studying the reaction of phenol and hydrogen peroxide, the present inventors have found that dihydroxybenzenes can be obtained in good selectivity without deposition of catalyst by suitably adjusting the concentrations of the phenol and the catalyst.

Thus, the above object has now been attained by adjusting the concentration of phenol feed to above 10%, by weight, based on the weight of the total feed, and by adding less than 1 mole percent of iron compound based on the phenol, according to the present invention.

DETAILED DESCRIPTION OF PREFERRED EMBODIMENTS

The process of the present invention can be readily carried out on an industrial scale by adding an aqueous solution of hydrogen peroxide to an aqueous solution of phenol containing below 1 mole percent of iron compound as a catalyst so that the concentration of phenol feed is above 10%, by weight, the total based on weight of feed.

In the process of the present invention, any ferrous or ferric compound is useful as the catalyst. These may be used in the form of inorganic salts such as sulfate, chloride, nitrate, phosphate, etc.; organic salts, such as acetate, oxalate, etc., hydroxide; or coordination compounds, such as acetylacetonate. Suitable catalysts include $FeSO_4$, $FeCl_2$, $Fe(NO_3)_2$, $FeCO_3$, $Fe(OH)_2$, $Fe(OCOCH_3)_2$, $FeC_2O_4$, $FeSO_4(NH_4)_2SO_4$, $Fe_2(SO_4)_3$, $FeCl_3$, $Fe(NO_3)_3$, $FePO_4$, $Fe(OH)_3$, $Fe(OCOCH_3)_3$, $Fe_2(C_2O_4)_3$, $$Fe(CH_2COCH_2COCH_2)_3.$$

The amount of catalyst used should be below 1 mole percent based on the phenol feed and preferably within the range of 0.0001 to 1 mole percent. When the amount of catalyst is above this range, for example, 3 mole percent as in the known method, the catalyst will be deposited and the selectivity of the reaction for the desired product will be lowered. If the amount is too small, the reaction velocity will be undesirably lowered.

The concentration of phenol feed based on the total feed should be within the range of 10 to 90%, by weight, and preferably within the range of 20 to 70%, by weight, depending upon the reaction velocity and the separation of product.

The process of the present invention can be carried out batchwise or continuously. In case of batchwise operation the initial concentration of phenol feed for based on the total feed including hydrogen peroxide, is controlled to above 10%, by weight. If the reaction is carried out continuously, the concentration of phenol in the total feed is maintained at above 10%, by weight.

The mole ratio of phenol to hydrogen peroxide is preferably within the range of 1:0.05 to 1 although the ratio may be optionally selected over a broader range. The degree of conversion of the phenol will depend highly upon the mole ratio. That is, if the ratio of hydrogen peroxide is larger the degree of conversion will increase while the conversion will be lower if the ratio of phenol is large. If If the conversion of phenol is too high, dihydroxybenzene will be further oxidized to produce higher oxides and thereby the selectivity of the reaction will be reduced. The lower the conversion, that is, the smaller the mole ratio of hydrogen peroxide, the better will be the selectivity of the reaction for the desired product. However, from an industrial point of view, it is preferable that the degree of conversion be high in order to keep the space time yield high. Accordingly, in the industrial practice of this invention the conversion should preferably be 5 to 50% and more desirably 1 to 30%. Therefore, the mole ratio of phenol to hydrogen peroxide is preferably selected within the range of 1:0.1 to 0.7.

In the process of the present invention the selectivity will not be significantly reduced even at elevated temperatures, since the amount of catalyst used is small. Thus, the reaction temperature may be optionally selected over a wide range, although it is preferably to carry out the reaction within the range of 0° to 120° C., more desirably 40 to 100° C., and depending upon the reaction velocity, reaction pressure, etc.

It is quite effective to add sulfuric acid, hydrochloric acid or nitric acid, etc. to the reaction system in order to obtain smooth initiation of the reaction, although the use of these acids does not significantly affect the reaction results and so is not essential.

The reaction products may be separated by the distillation of the reaction mixture. That is, first, unreacted phenol and water are distilled out as an azeotropic mixture and, secondly, the remaining phenol is distilled out. Finally catechol and hydroquinone are distilled out and the bottoms will be substantially polyhydroxybenzene as a byproduct.

The present invention will be further illustrated by reference to the following Examples. It should be understood, however, that these Examples are not intended to be limiting of the invention, unless otherwise so specified.

No catalyst was found to be deposited in the reaction solution.

Comparative Example

When Example 1 was repeated under the same reaction conditions with the exception of that the amount of ferrous sulfate heptahydrate was increased to 1.35 g. (0.0049 mole), a significant amount of catalyst and unreacted phenol, catechol and hydroquinone in the reaction solution were 10.4 g., 1.63 g. and 0.92 g., respectively. These values corresponded to 30.7% in conversion of phenol, 47% in selectivity (for phenol) of dihydroxybenzene and 44% in selectivity (for hydrogen peroxide).

Examples 2 to 10

Several experiments were carried out in the same manner as in Example 1 with the exception that the reaction conditions and type of catalyst were varied or shown in the following table.

TABLE 1

| Example number | Charge composition | | | | | | | |
|---|---|---|---|---|---|---|---|---|
| | Phenol, g. | Catalyst | | $H_2O$, g. | $H_2SO_4^*$, g. | $H_2O_2$ | | Charge concentration, weight percent |
| | | Kind | Quantity, g. | | | Concentration, weight percent | Quantity, g. | |
| 2 | 15 | $FeSO_4 \cdot 7H_2O$ | 0.45 | 20 | 0.2 | 4.5 | 40 | 20 |
| Comparative. | 15 | $FeSO_4 \cdot 7H_2O$ | 1.35 | 20 | 0.2 | 4.5 | 40 | 20 |
| 3 | 30 | $FeSO_4 \cdot 7H_2O$ | 0.004 | 4.7 | | 35 | 10.3 | 67 |
| Comparative. | 30 | $FeSO_4 \cdot 7H_2O$ | 1.35 | 4.7 | | 35 | 10.3 | 67 |
| 4 | 30 | $FeSO_4 \cdot 7H_2O$ | 0.10 | 4.7 | | 8.9 | 40.3 | 40 |
| 5 | 30 | $FeSO_4 \cdot 7H_2O$ | 0.001 | 4.7 | | 8.9 | 40.3 | 40 |
| 6 | 30 | $FeC_2O_4 \cdot 2H_2O$ | 0.013 | 4.6 | 0.1 | 8.9 | 40.3 | 40 |
| 7 | 30 | $FeCl_2 \cdot 4H_2O$ | 0.014 | 4.7 | | 8.9 | 40.3 | 40 |
| 8 | 15 | $FePO_4 \cdot 4H_2O$ | 0.10 | 15 | 0.1 | 4.5 | 40 | 21 |
| 9 | 15 | $FeSO_4 \cdot (NH_4)_2SO_4 \cdot 6H_2O$ | 0.10 | 15 | 0.1 | 4.5 | 40 | 21 |
| 10 | 30 | $FeSO_4 \cdot 7H_2O$ | 0.004 | 14.1 | | 35 | 30.9 | 40 |

| Example number | Reaction | | Phenol conversion, percent | Product | | Dihydroxybenzene selectivity, percent | |
|---|---|---|---|---|---|---|---|
| | Temperature, ° C. | Time, min. | | Catechol, g. | Hydroquinone, g. | For phenol | For $H_2O_2$ |
| 2 | 60 | 60 | 20.7 | 1.94 | 1.43 | 93 | 58 |
| Comparative. | 60 | 60 | 21.7 | 1.20 | 1.01 | 58 | 38 |
| 3 | 60 | 40 | 18.4 | 3.25 | 2.57 | 90 | 50 |
| Comparative. | 60 | 40 | 15.7 | 1.18 | 1.02 | 38 | 18 |
| 4 | 103 | 20 | 24.2 | 3.65 | 2.63 | 74 | 54 |
| 5 | 60 | 40 | 20.3 | 3.85 | 2.57 | 90 | 55 |
| 6 | 60 | 40 | 21.5 | 3.75 | 2.43 | 82 | 53 |
| 7 | 60 | 40 | 21.4 | 3.85 | 2.45 | 84 | 54 |
| 8 | 80 | 40 | 20.6 | 2.05 | 1.38 | 95 | 59 |
| 9 | 80 | 40 | 20.9 | 2.03 | 1.46 | 95 | 60 |
| 10 | 60 | 40 | 45.5 | 6.72 | 44.4 | 70 | 3z |

Note.—Using 1%, by weight, aqueous solution, in Examples 1 to 9, $H_2O_2$/phenol=0.33/1, and in Example 10, $H_2O_2$/phenol=1/1.

Example 1

15 g. (0.16 mole) of phenol, 0.45 g. (0.0016 mole) of ferrous sulfate heptahydrate, 74 g. of water and 0.4 g. of 1%, by weight, sulfuric acid aqueous solution were introduced into a 200 ml. reaction flask provided with a thermometer, a stirrer, a dropping funnel and a reflux condensor. 60 g. of 3%, by weight, hydrogen peroxide solution were added dropwise thereto at 20° C. while stirring over a period of 10 minutes. The amount of phenol was 10%, by weight, for the total amount of materials charged. After the addition was completed, stirring was continued at the same temperature for about 10 hours to complete the reaction. Unreacted phenol, catechol and hydroquinone produced in the reaction solution were quantitatively determined by gas chromatography and were found to be 10.76 g., 2.67 g. and 1.53 g., respectively. These values corresponded to 28.3% in conversion of phenol, and 85% and 72% in selectivity of dihydroxybenzene for phenol and hydrogen peroxide, respectively.

What is claimed is:

1. A process for preparing catechol and hydroquinone which comprises oxidizing phenol with hydrogen peroxide, wherein the concentration of phenol feed is above 10% by weight, based on the total feed in the presence of a catalyst consisting essentially of a sulfate, chloride, nitrate, phosphate, acetate, oxalate, hydroxide or acetylacetonate of iron, in a concentration of less than 1 mole percent based on the phenol.

2. The process as set forth in Claim 1 wherein the concentration of iron compound is within the range of 0.0001 to 1 mole percent based on the phenol.

3. The process as set forth in Claim 1 wherein said iron compound is ferrous sulfate.

4. The process as set forth in Claim 1 wherein said iron compound is ferrous oxalate.

5. The process as set forth in Claim 1 wherein said iron compound is ferrous chloride.

6. The process as set forth in Claim 1 wherein said iron compound is ferric phosphate.

7. The process as set forth in Claim 1 wherein said iron compound is ferrous ammonium sulfate.

8. The process as set forth in Claim 1 wherein the concentration of phenol feed based on the total feed is 10 to 90%, by weight.

9. The process as set forth in Claim 1 wherein the mole ratio of phenol to hydrogen peroxide is 1:0.1 to 0.7.

10. The process as set forth in Claim 1 wherein the reaction temperature is 0° to 120° C.

11. The process as set forth in Claim 1 wherein, in said reaction, the conversion of phenol is maintained within the range of 10 to 30%.

References Cited
UNITED STATES PATENTS

| | | | |
|---|---|---|---|
| 1,595,299 | 8/1926 | Hale | 260—621 G |
| 3,377,386 | 4/1968 | Chafetz | 260—621 G |
| 3,662,006 | 5/1972 | Massie et al. | 260—621 G X |

BERNARD HELFIN, Primary Examiner

N. MORGENSTERN, Assistant Examiner